UNITED STATES PATENT OFFICE.

JAMES G. TARR AND A. H. WONSON, OF GLOUCESTER, MASSACHUSETTS.

PAINT FOR SHIPS' BOTTOMS.

Specification forming part of Letters Patent No. 40,515, dated November 3, 1863.

*To all whom it may concern:*

Be it known that we, JAMES GAMAGE TARR and AUGUSTUS HENRY WONSON, of Gloucester, in the county of Essex and State of Massachusetts, have invented an Improvement in Paint for Ships' Bottoms; and we do hereby delare that the following is a full and exact description thereof and mode of making the same.

The object of our invention is to prevent the fouling of the bottoms of ships by the adhesion of barnacles, sea-weeds, and other substances, and this we effect by means of our improved paint or composition, which is applied to the hull of the vessel with a brush in the ordinary manner.

The substances used in making this paint are tar, copper ore in the form of an oxide, and naphtha or benzine. The union or mixture of these substances is effected in a peculiar manner, as herein described. We have found by experiment that when the tar and naphtha or benzine are mixed together and the copper oxide immediately added to it the substances cannot be so mixed or incorporated as to make a paint of uniform consistence. It cannot when thus mixed be laid on in a smooth and uniform coat with a brush.

When one hundred gallons of paint is to be made we proceed as follows: Into a vat or tank of suitable size we pour forty gallons of Stockholm tar and mix with this thirty gallons of benzine or naphtha, which must be added gradually, a few gallons at a time, and rapidly stirred. When the naphtha or benzine is all put in the mixture should be stirred for about half an hour, or until the ingredients are well incorporated. The vat must then closed with a tight-fitting cover and allowed to stand for about twenty-four hours. During this time a deposit takes place, the residuum consisting principally of heavy matters that are not soluble in the benzine or naphtha, the quantity thus deposited being usually about one gallon to each ten gallons of the mixture. The part remaining liquid is now drawn into another vat and thirty gallons of dry oxide of copper, finely pulverized, is added to it, and after being well stirred the paint is ready for use.

We prefer to employ the pyritous friable ores, which are easily reduced to fine powder.

About seven gallons of paint, prepared as above described, is required for one coat on a vessel of one hundred tons.

We have found by experiment that the hull of a vessel painted with our composition has remained free from shells and weeds for a period of twelve months, while another vessel painted in the common manner and employed in the same trade became so foul in six weeks as to require scraping.

When prepared in the manner herein stated the paint is very adhesive, and is adapted either for iron or wooden vessels.

What we claim, and desire to secure by Letters Patent, is—

The composition, prepared substantially as herein set forth, and for the purpose specified.

JAMES GAMAGE TARR. [L. S.]
  AUGUSTUS HENRY WONSON. [L. S.]

Witnesses:
  CYRUS STONE, Jr.,
  ROBT. C. MCKENZIE.